Aug. 13, 1929.                S. W. BATH                    1,724,635
                         TABLE DRIVING MECHANISM
                     Filed Aug. 5, 1924         2 Sheets-Sheet 1
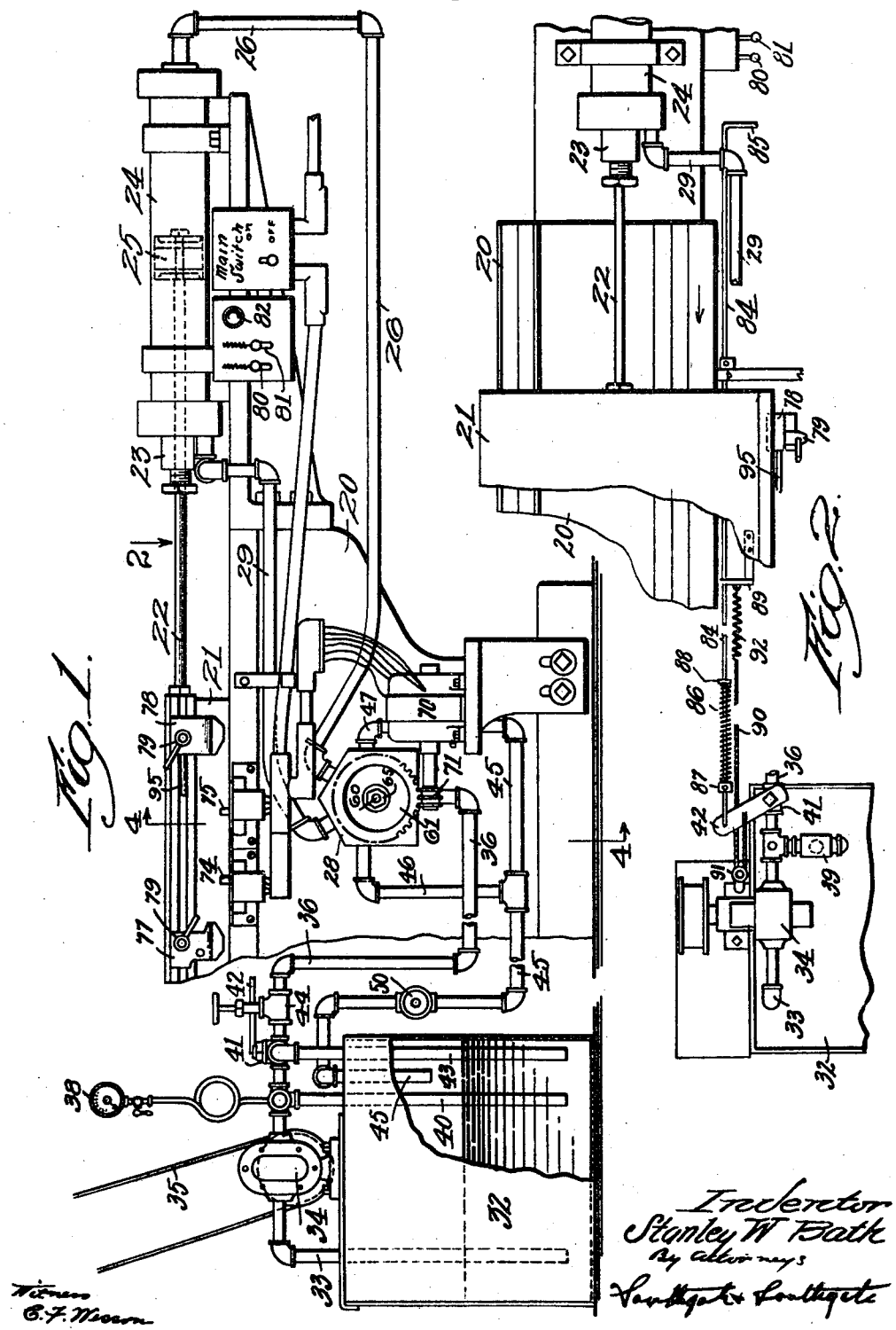

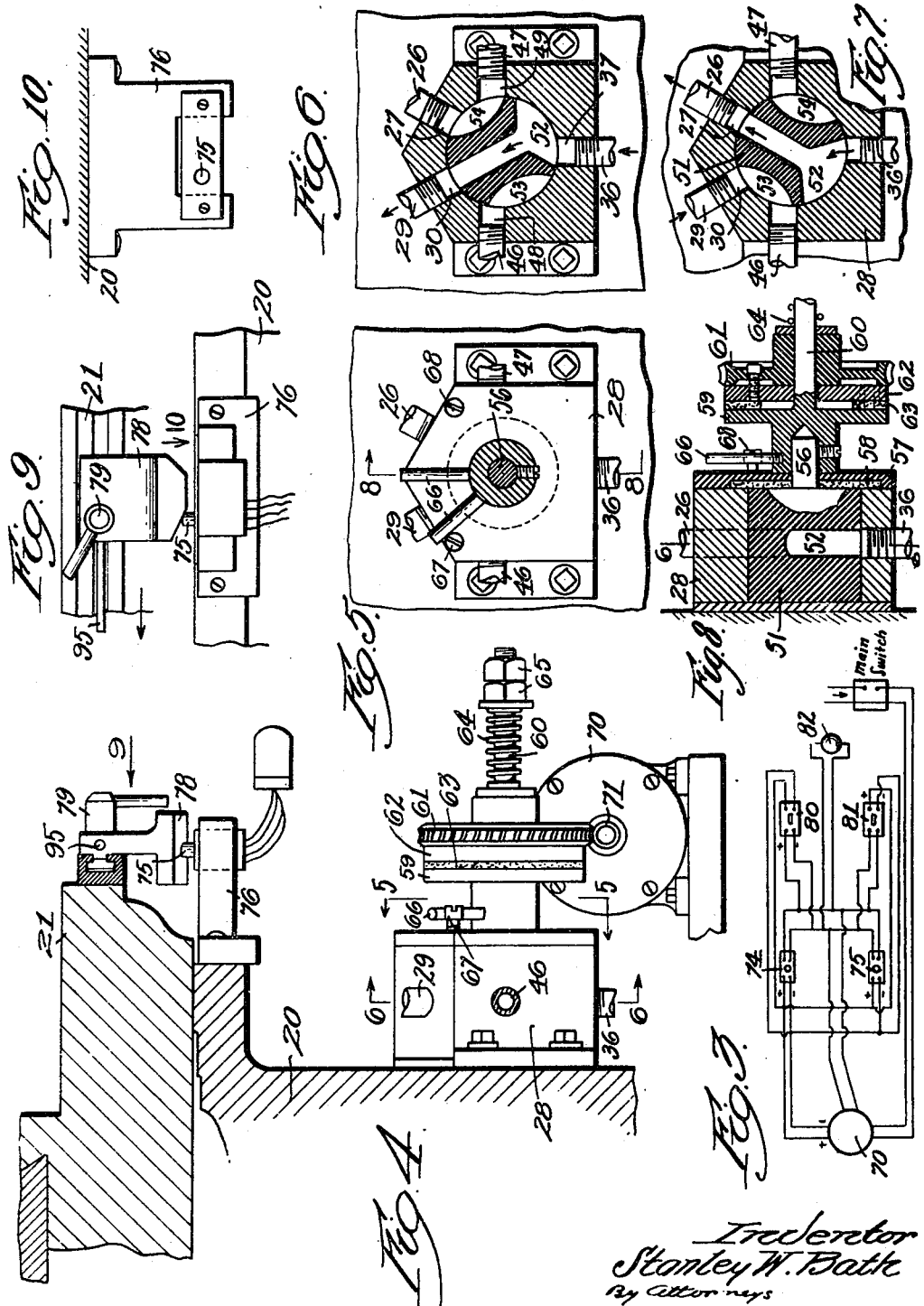

Patented Aug. 13, 1929.

1,724,635

UNITED STATES PATENT OFFICE.

STANLEY W. BATH, OF WORCESTER, MASSACHUSETTS, ASSIGNOR, BY MESNE ASSIGNMENTS, TO JOHN BATH.

TABLE DRIVING MECHANISM.

Application filed August 5, 1924. Serial No. 730,327.

This invention relates to driving mechanism for a reciprocating table or carriage, such as is commonly used in grinding machines or for other similar purposes.

It is the object of my invention to provide a table driving mechanism of the hydraulic or fluid pressure type, which will be quickly and accurately reversed at each end of its travel, and which may be very conveniently adjusted and controlled by the operator.

A further object of my invention is to provide such a table driving mechanism which shall be positive in its action and absolutely reliable when in use.

A third object of the invention is to provide special control devices to prevent overrunning of the table, special devices for convenient manual control of the table, and a tell-tale device for a purpose to be described.

A preferred form of my invention is shown in the drawings in which

Fig. 1 is a front elevation of my improved mechanism;

Fig. 2 is a partial plan view with certain parts cut away to show other parts of the mechanism;

Fig. 3 is a diagrammatic view of certain electrical circuits;

Fig. 4 is a partial sectional end elevation, taken along the line 4—4 in Fig. 1;

Fig. 5 is a detail sectional front elevation, taken along the line 5—5 in Fig. 4;

Figs. 6 and 7 are detail sectional elevations, taken along the line 6—6 in Fig. 4 and showing the parts in different positions;

Fig. 8 is a detail sectional elevation, taken along the line 8—8 in Fig. 5;

Fig. 9 is a detail front elevation looking in the direction of the arrow 9 in Fig. 4; and Fig. 10 is a detail plan view looking in the direction of the arrow 10 in Fig. 9.

Referring to the drawings, I have shown a base or bed 20 upon which a table 21 is supported and guided for reciprocating movement. A connecting rod 22 is secured at one end to the table 21 and extends through a suitable stuffing box 23 into a cylinder 24 where it is provided with a piston 25. One end of the cylinder 24 is connected by a pipe 26 to an opening 27 (Fig. 7) in a valve casing 28. The other end of the cylinder 24 is similarly connected by a pipe 29 to an opening 30 in the valve casing 28.

When oil or water under pressure or any other suitable fluid is forced into one of the pipes 26 or 29, the piston 25 is moved in a corresponding direction and the fluid in the opposite end of the piston is discharged through the other pipe 26 or 29. A storage tank 32 is provided for the oil or other liquid by which the pressure is transmitted.

The oil is drawn from the tank 32 through a pipe 33 by a pressure pump 34 which may be driven by a belt 35 or in any other convenient manner. The oil under pressure is delivered to a pipe 36 which is connected to a lower opening 37 in the valve casing 28. A pressure gauge 38 may be connected to the pipe 36 and a relief valve 39 (Figs. 1 and 2) may be similarly connected to the pipe 36 and, when open, will discharge oil through the waste pipe 40 to the tank 32.

The pipe 36 is also provided with a threeway valve 41 having a handle or arm 42 by which it may be turned to provide an open passage to the pipe 36 or a by-pass through a discharge pipe 43 to the tank 32. A shut-off valve 44 is provided in the pipe 36 for controlling the table feed as will be hereinafter described.

A return pipe 45 is connected by branch pipes 46 and 47 to openings 48 and 49 in the casing 28. The other end of the pipe 45 discharges into the tank 32 and is provided with a back-pressure valve 50 for a purpose to be described.

The valve casing 28 contains a cylindrical valve member 51 having a central or diametral passage 52 and two cutter segmental valve spaces 53 and 54. When the valve 51 is in the position shown in Fig. 6, oil will be delivered under pressure from the pipe 36 to the pipe 29 leading to the left hand end of the cylinder 24, as viewed in Fig. 1, and the oil forced out of the cylinder 24 will be conducted from the pipe 26 through the valve space or port 54 to the branch pipe 47 by which it will be returned through the pipe 45 to the tank 32. If the valve is reversed, as shown in Fig. 7, the oil will be delivered from the pipe 36 to the pipe 26 and the return oil will be conducted from the pipe 29 to the pipe 46.

In the usual operation of my improved driving mechanism, the pump 34 is driven at constant speed, and the speed of operation of the table is controlled by the valves 44 and 50. The entire speed control may be controlled by the valve 44 in the feed pipe 36, but it has been found desirable to use also the back pressure valve 50, as the table operates more smoothly if it is moved against a reasonable back pressure instead of having all of the pressure applied on the driving side of the piston. I mainly control the speed of the table by the valve 44, but for any considerable change in speed I also change the setting of the back pressure valve 50.

The starting and stopping of the table feed is controlled by the valve 41, by which the oil may be by-passed freely into the tank 32, thus permitting the table to come to rest.

I will now describe my improved mechanism for controlling the reversing valve 51. Referring to Fig. 8, the valve 51 fits closely but rotatably in the valve casing 28 and is provided with a stud or gudgeon 56 extending through an opening in a side plate 57 on the valve casing and also through a suitable leather packing 58. A friction plate 59 is fixed on the stud 56 and is provided with a rod or shaft 60 on which a worm gear 61 is rotatably mounted.

The gear 61 is provided with a disc 62 having a friction ring 63 of leather or other suitable material secured to the outer face thereof. A spring 64 on the rod 60 forces the friction ring 63 against the friction disc 59 and thus exerts a friction drag on the valve 51, tending to turn the valve in the direction in which the worm gear 61 is rotating. Lock nuts 65 are provided on the rod 60 for adjusting the pressure of the spring 64, thus increasing or decreasing the friction.

Stop rods or handles 66 are fixed in the hub of the friction disc 59 and engage stop pins or studs 67 and 68 (Fig. 5). A reversible electric motor 70 is provided with a worm 71 (Fig. 1) by which the worm gear 61 may be rotated in either direction. It will be clear that if the reversible motor 70 is rotated in either direction, it will correspondingly rotate the worm gear 61 and will move the stop rods or handles 66 until one of them engages a stop pin or stud 67 or 68 in the direction of rotation of the worm wheel. By repeatedly reversing the motor, the valve 51 may be turned from the position shown in Fig. 6 to that shown in Fig. 7 and vice-versa as desired.

In Fig. 3, I have indicated diagrammatically certain wiring connections for the motor 70, which connections include buttons or switches 74 and 75 which are mounted on brackets 76 (Figs. 4 and 10), on the bed 20. Cam-like dogs or depressing members 77 and 78 (Fig. 1) are mounted for longitudinal adjustment on the table 21 and may each be secured in adjusted position by a clamping nut 79. When the dog 77 comes in contact with the button 74, the button will be depressed, closing the power circuit to the motor 70 and causing the same to rotate in such a direction that the valve 51 will be reversed. The dog 74 has an engaging face of sufficient length so that the motor will be in operation long enough to reverse the valve, the remaining rotation of the motor causing slippage of the friction driving connection to the disc 59.

As soon as the direction of table control is reversed, the dog 77 will be carried away from the button 74 and the circuit will be broken and will remain broken until the dog 78 engages the button 75, when a second reversal of travel will occur. The motor 70 is thus in operation only at the period of reversal and then operates only until the reverse movement is under way.

The motion of the table may also be manually stopped or reversed by grasping the stop rod 66 and moving the valve 51 manually to mid-position for stopping the table, or to a reverse position for moving the table in the opposite direction.

I have also provided more convenient means for reversing the table travel manually at any desired point in its movement. For this purpose, I have provided additional switches 80 and 81 which are parallel with the switches 74 and 75 and which may be depressed manually to reverse the table when desired.

As it is not desirable to close one of the switches 80 or 81 when the opposite switch 75 or 74 is closed, I have provided a pilot light 82 which is lighted whenever any one of the switches 74, 75, 80 or 81 is closed, it being understood by the operator that he is not to use the switches 80 or 81 while the light is on.

The details of construction of the several switches form no part of my invention and any suitable switches may be used, preferably of the double pole type.

A shipper rod 84 (Fig. 2) extends longitudinally of the machine and is provided with a handle 85 by which it may be moved manually. The rod 84 is connected to the arm 42 on the valve 41 controlling the by-pass 43 and by which the table is started and stopped.

In connection with the shipper rod 84,

I have provided means for automatically stopping the table, if it should accidentally over-run the switches 74 and 75 without reversing the valve 51. A spring 86 is loosely coiled on the rod 84 between a collar 87 fixed thereto and a collar or washer 88 slidable thereon. An arm or bracket 89 is fixed to the table 21 and slides loosely over the shipper rod 84.

If the table is moving to the left in Fig. 2, the arm 89 will eventually engage the loose collar 88 and will exert yielding pressure through the spring 86 to swing the arm 42 and open the by-pass 43. The spring 86 permits continued movement of the table until the valve 41 is fully open.

A cord or chain 90 (Fig. 2) is connected at one end to the arm 42 and passes around a fixed guide pulley 91. It is then connected through a spring 92 to the arm or bracket 89 on the table 21. The chain 90 is made of such length that it will permit the table to approach its limit of travel to the right, but further movement will exert tension through the spring 92 and cord or chain 90 to swing the arm 42 in the direction to open the by-pass 43. The table will thus be brought to rest at its limit of travel in either direction if the valve 51 is not properly reversed.

Having thus described my invention, it is believed that the operation thereof will be readily apparent. The machine is started and stopped by the use of the rod 84 controlling the valve 41. The limits of movement in each direction are determined by the adjusted positions of the dogs 77 and 78. It will be noted that the dog 78 has a spacing stud 95 (Figs. 1 and 9) which prevents the dogs 77 and 78 being brought so closely together that both switch buttons 74 and 75 will be simultaneously depressed. The use of the spacing stud 95 makes it impossible for the dogs to press down more than one button at a time. The speed of the table travel is very delicately regulated by the valves 44 and 50 and the travel may be reversed at any desired time by use of the hand switches 80 or 81.

It will be noted that the valve reversing mechanism has no dead center, such as is common in reversing mechanism which is mechanically operated, but that the motor 70 operates positively to reverse the valve and will continue to operate until the reversal is completed and the movement of the table in the opposite direction has caused the depressed switch 74 or 75 to be opened.

Practical commercial tests of my invention have shown that my improved driving mechanism is capable of very smooth and even operation of a reciprocating table, with perfect speed control and with exceedingly reliable reversal of travel.

Having thus described my invention and the advantages thereof I do not wish to be limited to the details herein disclosed otherwise than as set forth in the claims, but what I claim is:—

1. Table driving mechanism comprising a closed cylinder, a piston connected to the table and mounted to be reciprocated in said cylinder, and means to supply a fluid under pressure to each end of said cylinder, said means including a valve effective to reverse the flow of fluid to said cylinder, a rotary motor connected to the valve to positively move said valve angularly for such reversal, and automatic means dependent upon the position of said table to start said motor in either direction of rotation.

2. Table driving mechanism comprising a closed cylinder, a piston mounted to be reciprocated in said cylinder one of said elements being connected to the table, and means to supply a fluid under pressure to each end of said cylinder, said means including a valve effective to reverse the flow of fluid to said cylinder, a reversible motor, a friction driving connection between said motor and said valve, and controlling devices for said motor operated alternately from said table as it approaches its desired limit of travel in either direction.

3. Table driving mechanism comprising a closed cylinder, a piston connected to the table and mounted to be reciprocated in said cylinder, and means to supply a fluid under pressure to each end of said cylinder, said means including a valve effective to reverse the flow of fluid to said cylinder, a reversible motor, a friction driving connection between said motor and said valve, controlling devices for said motor operated alternately from said table as it approaches its desired limit of travel in either direction, and additional manually controlled devices to reverse said table travel.

4. Table driving mechanism comprising a closed cylinder, a piston connected to the table and mounted to be reciprocated in said cylinder, and means to supply a fluid under pressure to each end of said cylinder, said means including a valve effective to reverse the flow of fluid to said cylinder, a reversible motor, a friction driving connection between said motor and said valve, controlling devices for said motor operated alternately from said table as it approaches its desired limit of travel in either direction, and a manually operated device for reversing said valve.

5. Table driving mechanism comprising a closed cylinder, a piston connected to the table and mounted to be reciprocated in said cylinder, and means to supply a fluid under pressure to each end of said cylinder, said means including a valve effective to reverse the flow of fluid to said cylinder, a reversible motor, a friction driving connection between said motor and said valve, controlling devices for said motor operated alternately from said table as it approaches its desired limit of travel in either direction, and automatic means to stop said table if it overruns said controlling devices.

6. Table driving mechanism comprising a closed cylinder, a piston connected to the table and mounted to be reciprocated in said cylinder, and means to supply a fluid under pressure to each end of said cylinder, said means including a valve effective to reverse the flow of fluid to said cylinder, means dependent upon the position of said table to actuate said valve, a shut-off valve, and connections from said table to the shut-off valve effective to close said valve when said table over-runs the controlling devices and approaches its extreme limit of travel in either direction.

7. Table driving mechanism comprising a closed cylinder, a piston connected to the table and mounted to be reciprocated in said cylinder, and means to supply a fluid under pressure to each end of said cylinder, said means including a valve effective to reverse the flow of fluid to said cylinder, means dependent upon the position of said table to actuate said valve, a shut-off valve, and connections from said table to the shut-off valve effective to close said valve when said table over-runs the controlling devices and approaches its extreme limit of travel in either direction, said connections being yielding to permit gradual stopping of said table.

8. Table driving mechanism comprising a closed cylinder, a piston connected to the table and mounted to be reciprocated in said cylinder, and means to supply a fluid under pressure to each end of said cylinder, said means including a valve effective to reverse the flow of fluid to said cylinder, a rotary motor connected to the valve to positively move said valve angularly for such reversal, means to start said motor in either direction of rotation, and additional manually controlled switches for said motor.

9. Table driving mechanism comprising a closed cylinder, a piston connected to said table and mounted to be reciprocated in said cylinder, a pump to supply fluid under pressure to said cylinder, a storage tank from which said pump draws fluid, a by-pass valve in the connection from said pump to said cylinder by means of which the table may be started and stopped and a valve controlling flow of fluid to and from the cylinder, a reversing motor directly actuating said valve alternately in opposite directions to permit proper flow.

10. Table driving mechanism comprising a closed cylinder, a piston connected to the table and mounted to be reciprocated in said cylinder, means to supply a fluid under pressure to each end of said cylinder alternately, said means including a single three way valve controlling the flow of fluid to each end of the cylinder and effective to reverse such flow, means adjustably mounted on said table to control said valves in accordance with the position of the table, a shut-off valve and connections from the table to said valve effective to close said valve when said table over-runs the controlling devices and approaches its extreme limit of travel in either direction.

11. Table driving mechanism comprising a closed cylinder, a piston connected to the table and mounted to be reciprocated in said cylinder, means to supply a fluid under pressure to each end of said cylinder alternately, said means including a single three way valve controlling the flow of fluid to each end of the cylinder and effective to reverse such flow, means adjustably mounted on said table to control said valves in accordance with the position of the table, a shut-off valve and connections from the table to said valve effective to close said valve when said table over-runs the controlling devices and approaches its extreme limit of travel in either direction, said connections being yielding to permit gradual stopping of the table.

12. Table driving mechanism comprising a cylinder, a double acting piston therein connected to the table, fluid supply and exhaust means communicating alternately with each end of said cylinder, regulating means for both said supply and exhaust means, a rotary motor, a flow reversing valve connected for positive actuation thereby and adapted to control both ends of the cylinder, and automatic means dependent upon the position of the table to start the motor in either direction of rotation.

13. Table driving mechanism, comprising a closed cylinder, a piston connected to the table and mounted to be reciprocated in said cylinder, means to supply a fluid under pressure to each end of said cylinder, said means including a valve effective to reverse the flow of fluid to said cylinder, a rotary electric motor of the reversible type, connections between said motor and said valve, whereby the valve will be moved angularly for reversal of the flow of fluid and automatic means to start said motor in either direction of rotation.

14. Table driving mechanism, comprising a closed cylinder, a piston connected to the table and mounted to be reciprocated in said cylinder, means to supply a fluid under pressure to each end of said cylinder, said means including a valve effective to reverse the flow of fluid to said cylinder, a reversible electric rotary motor connected to move said valve angularly for such reversal, means to start said motor in either direction of rotation, and additional manually controlled switches for said motor.

15. Table driving mechanism, comprising a cylinder, a double acting piston therein connected to the table, fluid supply and exhaust means communicating alternately with each end of said cylinder, regulating means for both said supply and exhaust means, a reversible electric rotary motor, a flow reversing valve connected to said motor for actuation thereby and adapted to control both ends of the cylinder, and automatic means dependent upon the position of the table to start the motor in either direction of rotation.

In testimony whereof I have hereunto affixed my signature.

STANLEY W. BATH.